US008639949B2

(12) United States Patent
Van Rijnswou (10) Patent No.: US 8,639,949 B2
(45) Date of Patent: Jan. 28, 2014

(54) DEVICE WITH A SECURE VIRTUAL MACHINE (75) Inventor: Sander M. Van Rijnswou, Veldhoven (NL)

(73) Assignee: NXP B.V., Eindhoven (NL)

( * ) Notice: Subject to any disclaimer, the term of this patent is extended or adjusted under 35 U.S.C. 154(b) by 879 days.

(21) Appl. No.: 12/668,961

(22) PCT Filed: Jul. 16, 2008

(86) PCT No.: PCT/IB2008/052859
§ 371 (c)(1),
(2), (4) Date: Jan. 13, 2010

(87) PCT Pub. No.: WO2009/013673
PCT Pub. Date: Jan. 29, 2009

(65) Prior Publication Data
US 2010/0199104 A1 Aug. 5, 2010

(30) Foreign Application Priority Data
Jul. 20, 2007 (EP) .................................... 07112858

(51) Int. Cl.
G06F 21/00 (2013.01)
(52) U.S. Cl.
USPC ............... 713/193; 380/44; 380/54; 380/263; 380/286
(58) Field of Classification Search
None
See application file for complete search history.

(56) References Cited

U.S. PATENT DOCUMENTS

| 6,950,941 | B1* | 9/2005 | Lee et al. ....................... 713/193 |
| 7,036,020 | B2 | 4/2006 | Thibadeau |
| 7,653,197 | B2* | 1/2010 | Van Dijk .......................... 380/44 |
| 8,171,289 | B2* | 5/2012 | Adler et al. .................... 713/168 |
| 8,254,579 | B1* | 8/2012 | Morgan et al. ................. 380/278 |
| 2003/0182246 | A1 | 9/2003 | Johnson et al. |
| 2005/0021946 | A1* | 1/2005 | Narayanan .................... 713/163 |
| 2005/0102672 | A1* | 5/2005 | Brothers ............................ 718/1 |
| 2005/0144443 | A1 | 6/2005 | Cromer et al. |
| 2005/0210467 | A1 | 9/2005 | Zimmer et al. |
| 2006/0271793 | A1* | 11/2006 | Devadas et al. ............... 713/189 |
| 2007/0038871 | A1* | 2/2007 | Kahlman et al. .............. 713/193 |
| 2008/0229119 | A1* | 9/2008 | Skoric et al. .................. 713/193 |

FOREIGN PATENT DOCUMENTS

CN 1535411 A 10/2004
WO 2005059629 A1 6/2005

OTHER PUBLICATIONS

Suh, G. Edward, et al., "Aegis: A Single-Chip Secure Processor", Information Security Technical Report 10; Elsevier (2005); pp. 63-73.

(Continued)

Primary Examiner — Hadi Armouche (57) ABSTRACT

A secure computing device includes a secure cryptographic module with a key generation unit for generating a cryptographic key in dependence on received input. A storage is used for storing a virtual machine that is executable on a processor and at least one program that is executable on the virtual machine. A virtual machine manager including a unit 132 for determining an identifier associated 5 with the virtual machine, a unit 134 for supplying a representation of the identifier to the secure cryptographic module and retrieving a cryptographic key from the secure cryptographic module; and a unit 136 for, under control of the cryptographic key, decrypting at least a part of data input to the processor and encrypting at least part of data output from the processor when the processor executes the virtual machine.

18 Claims, 7 Drawing Sheets (56) References Cited

OTHER PUBLICATIONS

Tuyls, P., et al., "Information-Theoretic Security Analysis of Physical Uncloneable Funcations"; Philips Research Labs., Eindhoven, The Netherlands, Reprinted in Financial Cryptography and Data Security (2005); pp. 141-155 (Reproduced Unnumbered).

Ravikanth, Pappu Srinivasa; "Physical One-Way Functions" (Thesis); Massachusetts Institute of Technology (2001), pp. 1-154.

Suh, G. Edward, et al., "Design and Implementation of the Aegis Single-Chip Secure Processor Using Physical Random Funcations"; 32nd Annual Int'l Symposium on Computer Architecture (2005), pp. 25-36 (Reproduced as pp. 1-12).

* cited by examiner

DEVICE WITH A SECURE VIRTUAL MACHINE

FIELD OF THE INVENTION

The invention relates to a device with a secure virtual machine.

BACKGROUND OF THE INVENTION

Security in the context of computing devices is still gaining importance. Was the subject at one time only relevant to servers, now it has spread via the desktop to all kinds of processor-based devices. Computing elements are becoming small, disseminated, unsupervised, and physically exposed. In addition to conventional computers, many devices nowadays include a processor whose software can be changed. For example, PDAs, smart-phones and satellite navigation devices can download application programs that can be run on the operating system of the device. At the same time the number of applications running on a given device is increasing, as is the number of suppliers, which makes it ever harder to say something definite about the security level. Against this background of an increasing number of different security sensitive platforms running more and more software, the liabilities are increasing. Some of the applications may also operate on protected content, e.g. audio tracks, movies, talking books, etc. The cost of security breaches is thus increasing as more sensitive information and responsibilities are put on the devices. Typically such content is protected using Digital Rights Management (DRM) system. The popular DRM applications like WINDOWS MEDIA DRM or APPLE's FAIRPLAY, which are in use for music and/or video downloads enforce rules of use on a customer, e.g. on which type or number of platforms the content may be rendered; a maximum duration for which the content may be rendered, restrictions on a number of copies that may be made, etc. A company that implements such a DRM system (supplies a software media player or a portable device with such a media player) may have to agree to robustness rules which typically demand minimum security levels, e.g. to ensure that the implementation can not be compromised with simple means. There can be stiff penalties for when security is broken.

Frequently, protections can be bypassed because attackers have full control of the operating systems and applications such as DRM players or mobile agents. To address these emerging threats, there have been significant efforts to build a secure computing platform that enables users to authenticate the platform and its software. The Trusted Platform Module from Trusted Computing Group, Next Generation Secure Computing Base from MICROSOFT, and TRUSTZONE from ARM all incorporate authentication mechanisms. If a DRM mechanism is implemented on these secure platforms, a content provider can encrypt its protected content just for a specific device executing trusted DRM software. While these systems can detect attacks that tamper with the operating systems or user applications, they cannot protect against physical attacks that tap or probe chips or buses in the system. In G. Edward Suh e.a. "Aegis: A single-chip secure processor", Information Security Technical report (2005) 10, 63-73, Elsevier a single-chip secure processor called AEGIS is introduced. In addition to mechanisms to authenticate the platform and software, the processor incorporates mechanisms to protect the integrity and privacy of applications from physical attacks as well as software attacks. Two key primitives, namely, Physical Random Functions (usually referred to as PUFs) and off-chip memory protection enables the physical security of the system. The AEGIS processor is able to shield against software and physical attacks by protecting a program before it is executed, protecting it during execution, and protecting it during processor mode transitions. When an application is initially run, the processor uses a program hashing technique to verify that the program was not corrupted while it was held in unprotected storage. During execution the processor uses integrity verification, memory encryption, and access permission checks to guarantee security under four different secure execution modes. For the memory encryption, the AEGIS processor uses a one-time-pad encryption scheme determined by choosing a random encryption/decryption key. The AEGIS processor also allows users to authenticate the processor and software. For this purpose, each processor has a unique secret key securely embedded using a PUF. For example, each processor can have its own private key whose corresponding public key is known to users. Then, the processor can sign a message with the private key to authenticate itself to the users. In order to support software authentication, the processor combines program hashes with a digital signature as in Microsoft NGSCB or TPM. When the operating system starts and enters a secure execution mode, the processor computes the cryptographic hash of the trusted part of the operating system, which is called the security kernel. This program hash is stored in a secure on-chip register, and is always included in the signature. Therefore, when users verify a signature from the processor, they know that the message is from a particular security kernel running on a particular processor. The security kernel provides the same authentication mechanism to user applications by computing their hashes when user applications enter a secure computing mode.

Another approach to make it easier to comply with the security requirements is virtualization. In the actual machine a 'virtual machine' (VM) is created that runs one or more security sensitive applications. The number of virtual machines supported on a single CPU can vary, for example for each user a respective VM can be created, or for each application, or even for parts of applications. The underlying idea of increasing security by using VMs is that security problems will be contained to the virtual machine involved. A malicious program part (e.g. application) is constrained to the virtual machine within which it is executed and can not influence any program part outside the involved VM. One well-known virtual machine is JAVA. JAVA applications run inside a sandbox, which shields them from other virtual machines running on the device.

But even with virtualization there remain problems. First of all, an application running inside a VM may try to 'break out'. This can happen either because of bugs in the virtualisation software, or because of features of the platform that may be inherently hard to virtualize (for instance it may be difficult to virtualize certain shared hardware components, such as I/O ports). The second problem is that, for legal and liability reasons, guarantees must be given on the quality of the virtualization, which can be hard for a large software program. Finally creating virtual machines that are fully secure is hard and expensive.

SUMMARY OF THE INVENTION

It would be advantageous to provide a system and method of the kind set forth with enhanced security.

To better address this concern, in a first aspect of the invention the secure computing device includes:

a secure cryptographic module, including an input, a key generation unit for generating a cryptographic key in dependence on received input and an output for producing the cryptographic key;

a processor;

a storage including a virtual machine that is executable on the processor, and at least one program that is executable on the virtual machine; and a virtual machine manager including: means for determining an identifier associated with the virtual machine, means for supplying a representation of the identifier to the secure cryptographic module and retrieving a cryptographic key from the secure cryptographic module; and means for, under control of the cryptographic key, decrypting at least a part of data input to the processor and encrypting at least part of data output from the processor when the processor executes the virtual machine.

According to the invention, a cryptographic key is determined that depends on an identifier associated with the virtual machine. This binds the cryptographic operation on the data to the virtual machine. As such encrypted data that leaves the processor during the execution of the virtual machine can not easily be used outside the virtual machine. The encryption is virtual machine-specific. As such, trying to break out of a virtual machine becomes less relevant since the encrypted data is only directly useable within the virtual machine. As such, impacts of a leak in a virtual machine are more confined.

In an embodiment, the key generation unit includes a Physical Uncloneable Function (PUF). The input to the PUF is associated with the virtual machine. As such, the PUF binds the cryptographic key and data encrypted with that key to the virtual machine. Since the PUF is uncloneable and highly tamper resistant, cloning of the secured data becomes useless. Operations on the cloned content item will not produce the desired result without the original PUF.

In an embodiment, the identifier is derived from at least the virtual machine itself and/or the program. The identifier may directly be based on the virtual machine, e.g. using an identifier of the virtual machine or determining a hash of the virtual machine. By deriving the identifier at least partly from the program, the PUF is bound to the program application itself. This makes cloning or tempering with the program much more difficult. The program may be an application program but may also be the operating system or part of the operating system. The program is associated with the virtual machine and as such an identifier derived from the program is also associated with the virtual machine. By binding it to the program, a malicious party can not easily break outside the context of program and since the program is designed to operate on the specific virtual machine, the program can also not easily be used on another virtual machine.

In an embodiment, the device includes a plurality of programs; each program being executable on the virtual machine and operating on an associated digital content item stored in a data storage; and the virtual machine manager being arranged to derive the representation of the identifier in dependence on the program and/or the digital content item associated with the program such that the representation of the identifier is unique for the program. The program operates on digital content stored in a storage. Particularly, the digital content may be protected content, such as audio/video protected using a DRM system. The program can then be the player. The identifier is made unique for the program by making sure that the identifier depends on the program itself and/or the content. As such the program and if so desired also the content can be bound to the virtual machine. The content (or part of it) can be encrypted in a form that it can only be decrypted when run on the associated virtual machine.

In an embodiment, the secure computing device is operated under control of an operating system arranged to execute multiple processes associated with the virtual machine; the means for determining an identifier being arranged to:

determine a session identifier at a moment a process is activated, where the session identifier is unique for the process or a program associated with the process;

supply the session identifier as the identifier associated with the virtual machine;

securely store in association with the process as a session key an output generated by the secure cryptographic module; and during a period in which a process is active use the session key stored in association with the process as the cryptographic key for encrypting/decrypting at least part of the data operated upon by the process.

In this situation, each individual process is protected separately for each execution session. Analysing the exchange of data between a program and a memory external to the processor in order to break the encryption key will thus not result in a key that would be useable the next session. If so desired the session identifier may be unique for a program of which the process is a part, such that processes with a same program can use a same session identifier enabling an easy exchange of data between processes of a single program.

In an embodiment, the session identifier depends on at least one of: a process identifier, a random number or a timestamp. Preferably, the session identifier depends directly on the process, e.g. by using a process identifier as input to the secure cryptographic module. To make the session key unique for each session, preferably other information like a timestamp (e.g. based on the moment of activation) and/or random number is used.

In an embodiment, the device is arranged to cryptographically secure access by the processor to and from at least one of the following units external to the processor: the storage, an electronic main memory, a program cache, a data cache, an I/O bus, registers. By securing data being exchanged with one or more of these units external to the processor, the appropriate security level can be chosen.

In an embodiment, the device includes means for calculating a hash of the identifier associated with the virtual machine; the key generation unit generating the cryptographic key in dependence on the hash. Using a hash makes it easy to let the identifier depend on a large amount of data, making it possible to bind a large amount of software and/or data to the virtual machine.

In an embodiment, the virtual machine manager and processor are implemented in a same tamper resistant unit. In this way the plain text exchange of data between the processor and virtual machine manager is secured. The virtual machine manager can be made as a separate integrated circuit combined in one tamper resistant package with the processor. The virtual machine manager can then be used easily in combination with different types of processors.

In an embodiment, the virtual machine manager is implemented in software and arranged to be executed on the processor. Implementing the virtual machine manager in software and executing it on the processor it protects, makes it inherently more difficult to intercept plain text data. The processor may, optionally, be implemented in a tamper resistant package.

In an embodiment, the PUF is physically integrated with the virtual machine manager. By physically integrating the PUF with the virtual machine manager, a physical link is established strengthening the bond between the key generated by the PUF and the virtual machine manager.

In an embodiment, the virtual machine manager is implemented on a semiconductor device and the PUF is integrated on the semiconductor device. By integrating the PUF into the semiconductor device, a cost-effective and strong-binding is achieved. In a further embodiment, the PUF is of an optical type or an electronic type. Using an electronic PUF is very cost-effective, since this requires no additional processing steps. Using an optical PUF integrated in the semiconductor device gives a strong protection.

To address this concern, in a further of the invention a method of securing data being exchanged with a processor in a secure computing device is provided, wherein the method includes:

loading a virtual machine in the processor and executing the virtual machine;

loading at least one program into the processor that is executable on the virtual machine;

determining an identifier associated with the virtual machine, in a secure cryptographic module generating a cryptographic key in dependence on a representation of the identifier; and under control of the cryptographic key, decrypting at least a part of data input to the processor and encrypting at least part of data output from the processor when the processor executes the virtual machine.

These and other aspects of the invention are apparent from and will be elucidated with reference to the embodiments described hereinafter.

DETAILED DESCRIPTION OF EMBODIMENTS

Figure 1:
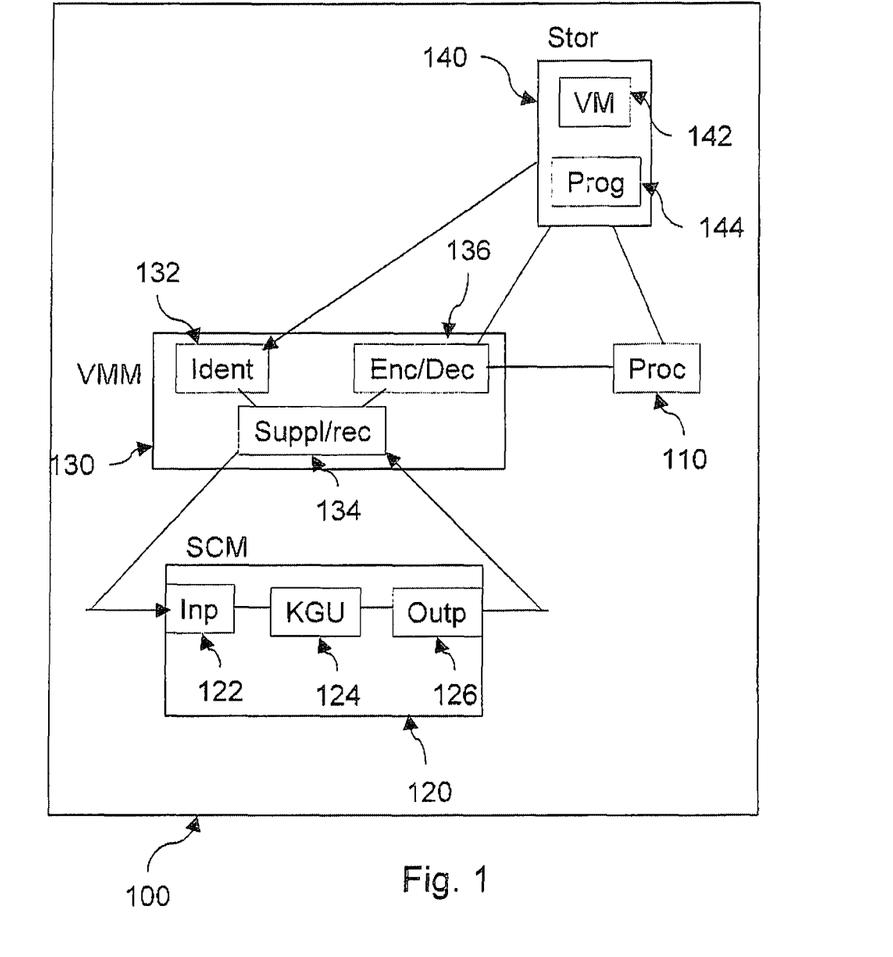
FIG. 1 shows a block diagram of an exemplary system in which the invention may be used.

Where in the figures same reference numerals are used, they represent the same functionality, unless specified differently. FIG. 1 shows a block diagram of an exemplary device 100 in which the invention may be used. The device is used for securely executing a computer program. The program is executable on a virtual machine. Virtual machines, such as JAVA, are well-known and as such not the subject of the invention. The program (Prog) 144 and associated virtual machine (VM) 142 are stored in a storage 140. Any suitable storage may be used, such as a hard disk, optical storage (e.g. of the CD, DVD, Blue Ray Disc, or HD-DVD families), or be embedded in a semiconductor device (e.g. Flash, MRAM, smart-card, etc.). The device 100 further includes a processor 110. The processor may be any suitable type, such as a processor typically used in a desktop computer, laptop, server, set-top box. The processor 110 may also be a type, such as a microcontroller or dedicated signal processor or even VLIW, typically used in smaller game machines or portable devices such as mobile phones or even smart-cards. The virtual machine 142 is executable on the processor 110. Typically it will be loaded from the storage 140 into a main memory, such as RAM, and then executed on the processor 110. The program 144 is then loaded and executed within the context of the virtual machine. As such the program is restricted to the functionality offered by the virtual machine. Typically, the program will operate on digital data. The data may be stored in the same data storage 140 but may also be accessible via other hardware means, such as I/O ports. The data may even be received from or sent to external devices. The data itself may take any form, such as documents (e.g. produced by word processing, a spreadsheet, presentation), programs (e.g. in source code, executable form or interpretable form, such as JAVA), digital audio (e.g. content items in MP3, WMA, AAC format, etc.), still images, video, etc. The data may also be very small, such as information stored in a smart card. A content item of data can then be the information required for one specific application program that uses the data. For example, the smart-card may contain a respective content item (or set of content items) for a bank, shops, petrol stations, etc. The system 100 further includes a secure cryptographic module (SCM) 120. As will be described in more detail below, in a preferred embodiment, the secure cryptographic module (SCM) 120 includes a physical uncloneable function (PUF). The secure cryptographic module 120 includes an input 122 for receiving a challenge and an output 126 for producing a response to the challenge. The response is calculated by a key generation unit 124 that generates a cryptographic key in dependence on the challenge/input received via input 122. In principle any suitable cryptographic key generation algorithm may be used, such as the KDF algorithm (Key Derivation Function) as described in X9.44, Public Key Cryptography for the Financial Services Industry, where the generated key depends on the input. The secure computing device 100 further includes a virtual machine manager (VMM) 130. The virtual machine manager 130 includes means 132 for determining an identifier associated with the virtual machine. In principle any suitable identifier may be used. In an embodiment, the identifier is derived from at least one of the following:

the virtual machine itself. For example, a virtual machine identifier may be stored in the data storage 140 in association with the virtual machine. The virtual machine identifier may be a single identifier or a composite identifier. For example, it may identify a type of virtual machine (e.g. Java) and a version identifier (e.g. SE 5.0).

the program. The program may be an application program but may also be the operating system or part of the operating system. The program is associated with the virtual machine and as such an identifier derived from the program is also associated with the virtual machine. By binding it to the program, a malicious party can not easily break outside the context of program and since the program is designed to operate on the specific virtual machine, the program can also not easily be used on another virtual machine. The identifier based on the program may simply be a digital representation of the program name. The association of the program with the virtual machine may also be established in any suitable way, e.g. in the form of a filename extension (e.g. java).

In an embodiment, the secure computing device 100 includes a plurality of programs that all may be stored in storage 140. Each program is executable on the virtual machine 142 and operates on an associated digital content item stored in a data storage (e.g. the same storage 140 that also stores the program). The virtual machine manager (and more specifically unit 132) is arranged to derive the representation of the identifier in dependence on the program and/or the digital content item associated with the program such that the representation of the identifier is unique for the program.

The device 100 further includes means 134 for supplying a representation of the identifier to the secure cryptographic module 120 and retrieving a cryptographic key from the secure cryptographic module 120. Means 134 may be implemented in a very straight-forward form, for example in hardware by simply connecting the output of the means 132 to the input 122 of the secure cryptographic module 120 and connecting the output 126 of this module an encryption/decryption unit 136. The encryption/decryption unit 136 forms means for, under control of the cryptographic key, decrypting at least a part of data input to the processor and encrypting at least part of data output from the processor when the processor executes the virtual machine. One of the suitable encryption algorithms is AES-128 in CTR or CBC mode (counter mode or cipher block chaining mode). The encryption/decryption unit unit 136 may perform also other cryptographic techniques that increase the security of information outside the processor 110. For example, authentication may be used, e.g. a cryptographic digital signature calculated over data outside the processor is stored in the data storage for later verification. When the data is used, the signature is read and verified.

Figure 5:
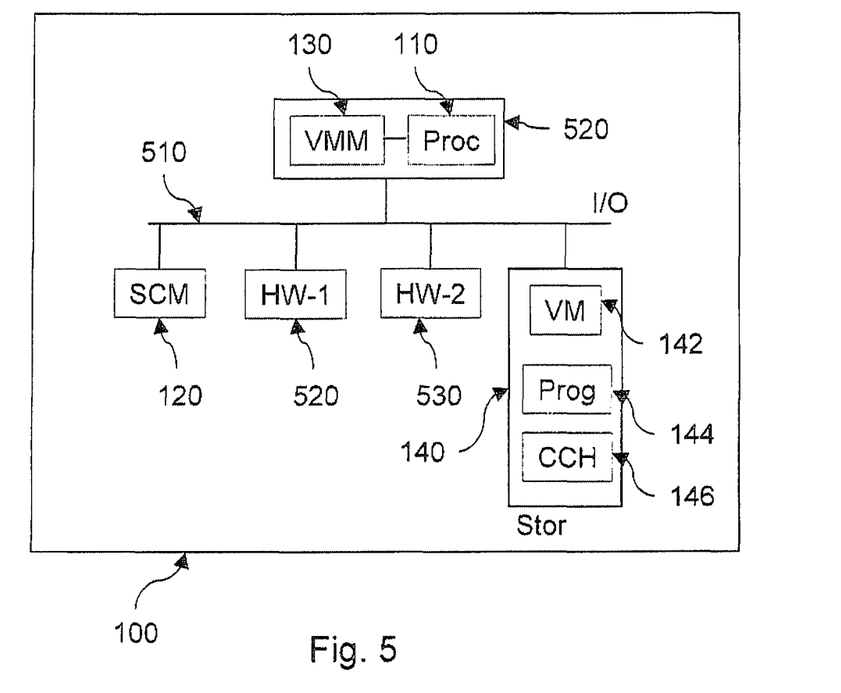
FIG. 5 illustrates units external to the processor that can be cryptographically securely be accesses by the processor.

In an embodiment, the virtual machine manager 130 is implemented in a component separate from the processor 110. The virtual machine manager 130 may then be implemented in hardware, software or a combination of both. In this embodiment, the virtual machine manager and processor are preferably implemented in a same tamper resistant unit, such as a tamper resistant IC package. Techniques for making a package tamper resistant are well-known. Such a combination is shown in FIG. 5 and will be described in more detail below with reference to FIG. 5.

Figure 6:
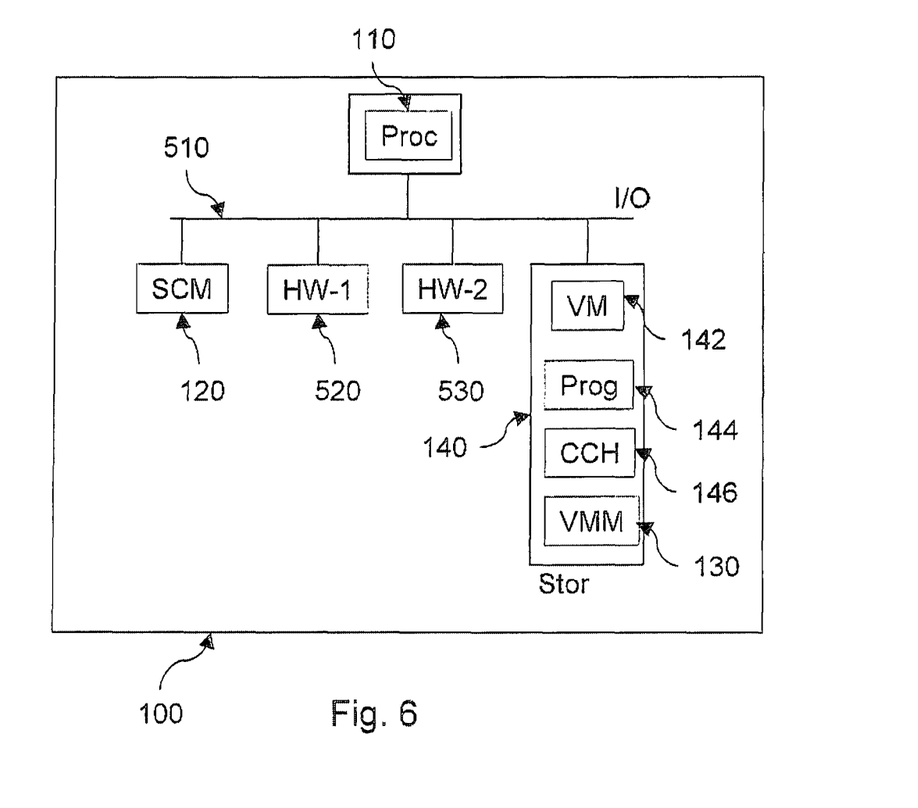
FIG. 6 shows an embodiment wherein the virtual machine manager is executed in software by the processor.
Figure 7:
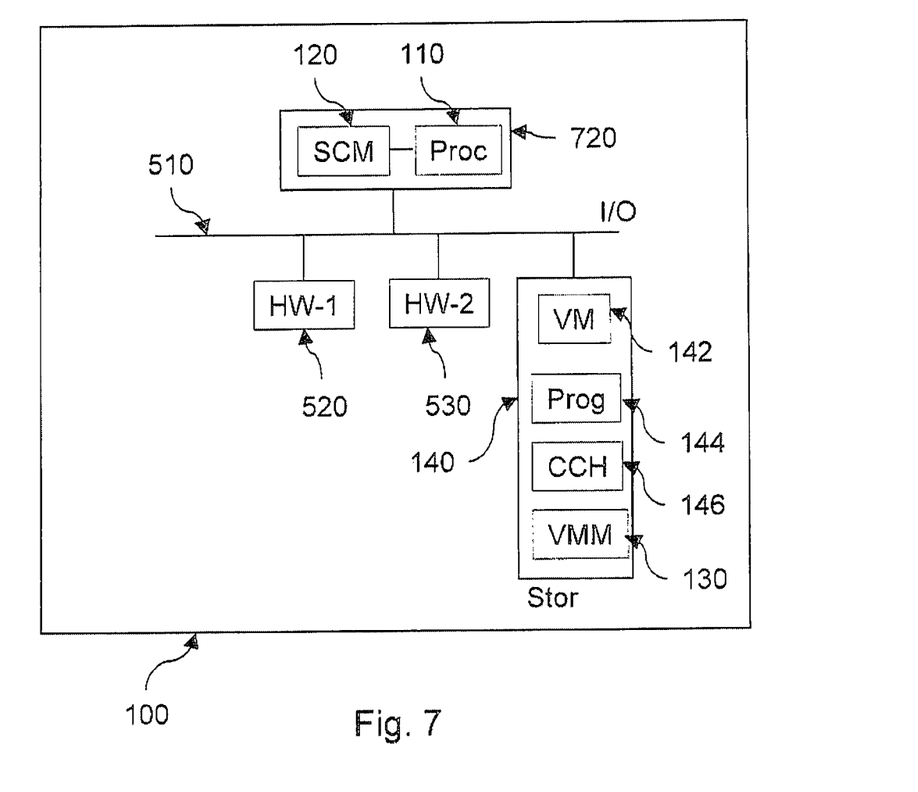
FIG. 7 shows an embodiment, wherein the secure cryptographic module is physically integrated with the processor into a single package.

10. In an alternative embodiment, the virtual machine manager 130 is implemented in software and arranged to be executed on the processor 110. This situation is also shown in FIGS. 6 and 7 and will be described in more detail below with reference to FIGS. 6 and 7.

Figure 2:
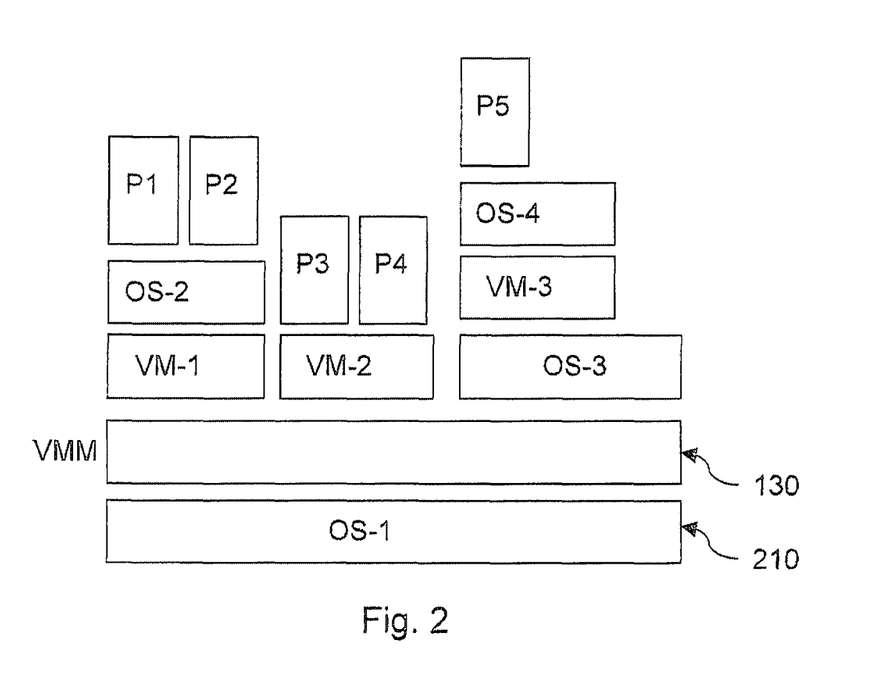
FIG. 2 the role of the virtual machine manager, the virtual machine and the program in the form of a software hierarchy.

FIG. 2 illustrates the role of the virtual machine manager (VMM) 130, the virtual machine 142 and the program 144 of FIG. 1 in the form of a software hierarchy. The VMM forms a core layer hierarchically below the virtual machines. Shown are virtual machine VM-1, VM-2, VM-3. With hierarchically below is meant that first the VMM needs to be active before a virtual machine can be activated. As such the virtual machines operate on top of the VMM. If the VMM is implemented in hardware (or at least as a unit separate from the processor 130), the VMM typically forms the bottom layer. If the VMM is actually implemented in software and executed on the processor 130 it is possible (but not required) that the VMM is a program (or set of program modules/libraries) running on an operation system, shown as OS-1. This may be any suitable conventional operating system; on a PC platform typically WINDOWS or LINUX based. It may also be a reduced-size kernel of an operating system only providing core functionality, other functionality being provided by the VMM or the virtual machine. Using a reduced-size kernel is particularly advantageous when device 100 is a small device, such as a portable device or a smart-card.

The virtual machine may be loaded directly on top of the virtual machine manager VMM as is shown for virtual machine VM-1 and VM-2. For virtual machine VM-1 it is shown that within the virtual machine an operating system OS-2 is loaded, offering functionality to the programs P1 and P2. Such a scenario is well-known from PCs where it is possible to execute LINUX (acting as OS-2) within a WINDOWS environment (acting as OS-1) or the other way around. For VM-2 it is shown that the programs P3 and P4 are loaded directly on top of the virtual machine VM-2, where virtual machine VM-2 supplies the functionality required by the programs. This scenario is also well-known, e.g. from JAVA where JAVA applets (the programs) are executed (e.g. interpreted) by the JAVA virtual machine, that may be loaded in an operating system like WINDOWS. FIG. 2 also illustrates a further scenario where an operating system OS-3 is loaded directly on top of the virtual machine manager VMM. On top of OS-3 a virtual machine VM-3 is loaded. In the shown scenario, on top of the virtual machine VM-3 a further operating system OS-4 is loaded on top of which the program P5 is loaded.

All of the scenarios shown in FIG. 2 can be used. The scenarios wherein the virtual machine provides the execution environment for the operating system (e.g. shown for VM-1 and VM-3) is preferred. In such a scenario, the application program and its operating system are confined to the environment created by the virtual machine in which they run. Such a scenario is usually referred to as 'sandboxes'. A sandbox can provide a greater level of isolation between processes by letting them run in different virtual machines and different instances of the operating system than is achieved when running multiple processes on the same instance of an operating system. It will be appreciated that the device according to the invention may execute one or more virtual machines. The virtual machines may be instances of a same type of virtual machine but may equally well be different types of virtual machines.

Well-know forms of virtual machines are:

Application virtual machine. Such a virtual machine is a piece of computer software that isolates the application being used by the user from the computer. Because versions of the virtual machine are written for various computer platforms, any application written for the virtual machine can be operated on any of the platforms, instead of having to produce separate versions of the application for each computer and operating system. The application is run on the computer using an interpreter or Just In Time compilation. One of the best known examples of an application virtual machine is SUN MICROSYSTEM'S JAVA Virtual Machine.

A virtual environment (otherwise referred to as Virtual private server). A virtual environment is in fact a virtualized environment for running user-level programs (i.e. not the operating system kernel and drivers, but applications). Virtual environments are created using the software implementing operating system-level virtualization approach, such as VIRTUOZZO, FREEBSD Jails, LINUX-VServer, SOLARIS Containers, chroot jail and OpenVZ.

It is well-known how to perform such virtualization. The following three major ways are used:

Emulation, full system simulation, or "full virtualization with dynamic recompilation"—the virtual machine simulates the complete hardware, allowing an unmodified OS for a completely different CPU to be run.

Paravirtualization—the virtual machine does not simulate hardware but instead offers a special API that requires OS modifications.

Native virtualization and "full virtualization"—the virtual machine only partially simulates enough hardware to allow an unmodified OS to be run in isolation, but the guest OS must be designed for the same type of CPU. The term native virtualization is also sometimes used to designate that hardware assistance through Virtualization Technology is used.

In an embodiment according to the invention, the secure computing device 100 is operated under control of an operating system that can execute multiple processes associated with the virtual machine. For example, the processes may be related to one or more application programs executing in the virtual machine. It may also be processes of the virtual machine itself or even processes of the operating system. In the context of this invention it is irrelevant whether the process is actually a process, task, thread, fibre or similarly executed part of a program that can be scheduled. In this embodiment, preferably the means 132 for determining an identifier are arranged to determine a unique session identifier at a moment a process is activated. It is well-known in operating systems to determine such a moment and perform initialization of the process. Determining the identifier is preferably integrated with this. Operating systems already use process identifiers, such as numbers and textual descriptions. These identifiers can in principle be used. The session identifier is supplied as the identifier associated with the virtual machine to the secure cryptographic module 120. The output generated by the secure cryptographic module 120 is then securely stored in association with the process as a session key, for example in a secure register in the virtual machine manager 130. Secure storage in itself is known. The virtual machine manager then uses during a period in which a process is active use the session key stored in association with the process as the cryptographic key for encrypting/decrypting by unit 136 of at least part of the data operated upon by the process. As an alternative to using a unique identifier determined by the process, the identifier may also be unique for the program to which the process belongs (e.g. based on a program identifier). For example, at the moment a first process of a program is activated the session identifier is determined. This session identifier can then be used for all processes of the program within the current execution session of the program. A next time the program is activated another session identifier will then be selected. Basing the session identifier on the program has the advantage that exchange of data between processes of the same [program is easier. On the other hand, if no easy exchange is desired (e.g. the processes are developed by different parties and should not have easy access to shared data), preferably the session identifiers are unique for the processes.

As described, the session identifier preferably depends on a process identifier or program identifier. In a preferred embodiment, the session identifier is also made unique in time, for example, by also letting the session identifier depend on a random number and/or timestamp (e.g. moment of activation of the process/program).

Figure 3:
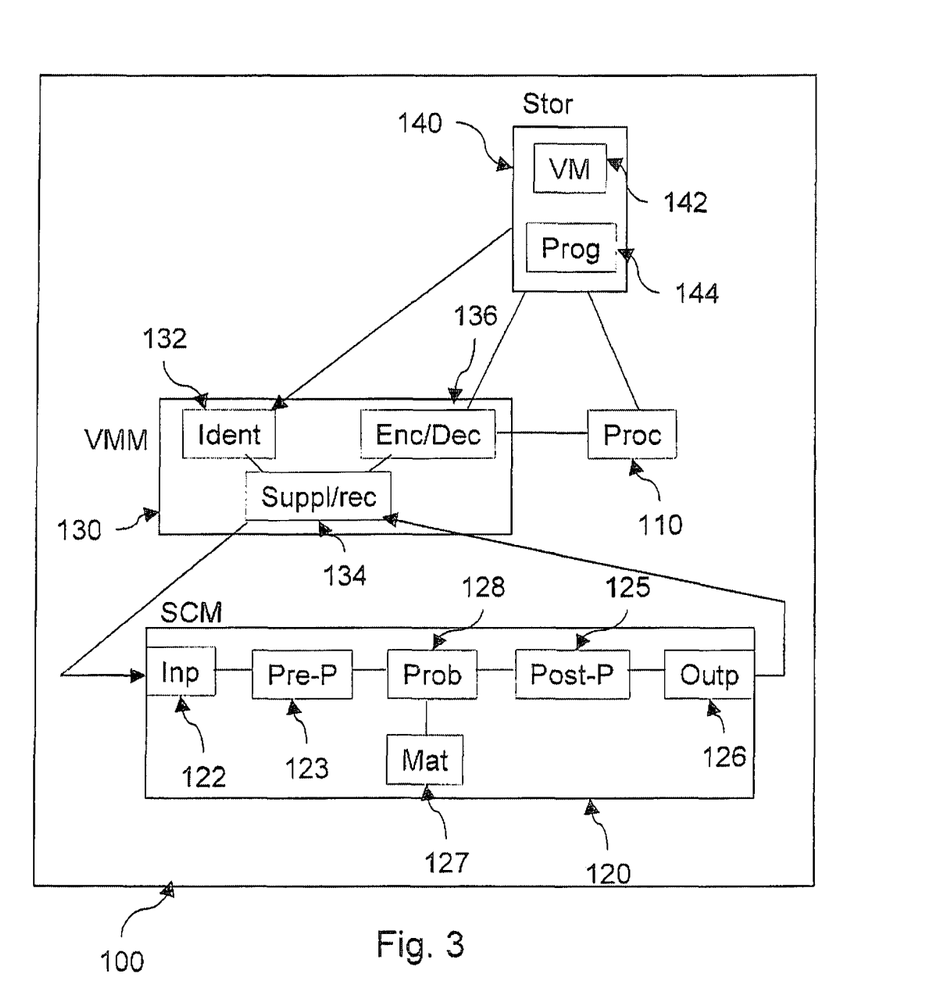
FIG. 3 shows an embodiment wherein the key generation unit includes a PUF.

FIG. 3 shows an embodiment wherein the key generation unit 124 includes a Physical Uncloneable Function, hereinafter referred to as PUF. Recently, PUFs were introduced by Pappu "Physical One-Way Functions" MIT, March 2001 as a cost-effective way of generating secure keys for cryptographic purposes. PUFs are described for use as a hash function and for authentication purposes. Because through PUFs the data is stored essentially in a material rather than in a circuit, the technology can also be used as part of a device that needs authentication, such as a security sensor. Many further developments focus on developing different types of PUFs. The application of PUFs focuses on using PUFs as unique identifiers for smart-cards and credit cards or as a 'cheap' source for key generation (common randomness) between two parties, see P.Tuyls e.a. "Information-Theoretic Security Analysis of Physical Uncloneable Functions", based on the very useful properties of PUF of the uniqueness of the responses and uncloneability of the PUF. A PUF can be seen as a function that is realized by a physical system, such that the function is easy to evaluate but the physical system is hard to characterize. A PUF comprises a physical object that is inherently uncloneable (since it contains many uncontrollable ("random") parameters during production of the object). When a stimulus (usually called challenge) is applied to the object, it reacts with a response that can be measured. This challenge-response behaviour characterizes the structure completely. Furthermore the structure is tamper-evident, meaning that if the structure is physically damaged (by an attack), its challenge-response behaviour changes noticeably. By using a PUF to represent a cryptographic key, the key becomes uncloneable. Hence, it can not be given away or copied. A PUF is a physical system designed such that it interacts in a complicated way with stimuli (challenges) and leads to unique but unpredictable responses. Hence, a PUF is similar to a keyed hash function, where the material plays the role of the key. In order to be hard to characterise, the system should not allow efficient extraction of the relevant properties of its interacting components by measurements. Physical systems that are produced by an uncontrolled production process, i.e. one that contains some randomness, turn out to be good candidates for PUFs. Because of this randomness, it is hard to produce a physical copy of the PUF. Furthermore, if the physical function is based on many complex interactions, then mathematical modelling is also very hard. These two properties together are referred to as Uncloneability.

Clearly, the PUF as shown in FIG. 3 also contains physical material 127 with "random" characteristics inherent in the physical properties of the material or physical/chemical process of producing the material. The PUF also contains a probe 128 for, in dependence on the values received via the input 122, measuring/sensing properties of the material 127. The PUF itself is not the subject of the inventions. In principle, any suitable PUF may be used. The PUF may also contain a pre-processing unit 123 and a post-processing unit 125. The pre-processing unit 125 may, for example, perform a hashing operation on the received input. The output of the hashing operation (hash) is then supplied to the probing unit 128. The post-processing unit 125 may perform a post-processing on the output of the probe 128. For example, if the probe provides useful information mixed with bits that have no information (e.g. a lot of 'zero' bits), a hash may be used to condense the output. It is also well-known that the probe is subject to noise. The response generated by the probe may be slightly different on each evaluation even for exactly the same challenge (input). It is known to 'filter-out' such noise using error-correcting codes. Block 125 can perform such filtering based on helper-data that may be stored in a memory (not shown) in the PUF 120.

As is known, a PUF can generate a cryptographic key. As such the output (response) of the PUF can be fed directly to the encryption/decryption unit 136. If so desired, first certain operations may be performed on the response before supplying it to the encryption/decryption unit 136, such as combining the response with other key-like data and/or performing a conventional hash on the response. Such post-processing may be performed by unit 125 shown in FIG. 2 but may also be performed in the Virtual Machine Manager 130.

In a preferred embodiment, the PUF is physically integrated with the virtual machine manager. The integration is preferably in an inseparable way, meaning that the PUF gets damaged if an attacker attempts to remove the PUF. This makes the virtual machine in which the PUF is embedded uniquely identifiable and uncloneable. For example, entire unit 120 may be physically integrated with unit 130. By integrating these two components it also becomes more difficult to intercept the key. It is also more easy to make the units more tamper resistant by simply using a single tamper resistant package. Moreover tampering with the material of the PUF will reveal itself. As such it is known to let the material of the PUF play a role in providing the tamper-resistance (e.g.

by integrating PUF material in a coating of the package). Because the PUF cannot be copied, the virtual machine manager cannot be copied either. Preferably, also the processor 110 is physically integrated with the PUF, extending the copy protection also to the processor. The more parts of the device are physically bound to the PUF, the better the device can be described in qualitative terms, and is thus better suited for evaluations on security as frequently required for DRM implementations.

When the PUF is implemented on a semiconductor device, in principle any type of PUF may be used that can be integrated with an electronic device. Optical types of PUFs are being developed that are implemented using semiconductor technology and can be integrated with electronic circuits. For example, PUFs are being developed using semiconductor LEDs as probes. Alternatively, PUFs may be used that are of an electronic type. Several of such PUFs are being developed currently. For example, where the PUF is based on inherent differences in resistance or capacitance of an etched circuit (e.g. measured in delay lines in the IC), inherent differences in an initial state of an electronic memory (e.g. SRAM start-up noise), inherent differences in separate coatings provided on the IC, e.g. in the form of random patterns of particles with electrical properties in the coating or difference in capacitance of the coating, or based on production variation in the properties of logical gates (flip-flop PUF). An example of silicon PUF is described for the AEGIS processor.

At this moment, optical PUFs provide a high level of security. Optical PUFs consist of a physical structure containing some scattering material which is randomly distributed. They exploit the uniqueness of speckle patterns that result from multiple scattering of laser light in this disordered optical medium. The input (challenge') can be e.g. the angle of incidence, focal distance or wavelength of the laser beam, a mask pattern blocking part of the laser light, or any other change in the wave front. The output may be the speckle pattern. Physical copying is difficult for two reasons:

(i) the light diffusion obscures the locations of the scatterers (ii) even if all scatterer locations are known, precise positioning of a large number of scatterers is very hard and expensive, and requires a production process different from the original randomized process.

Several improvements have been developed so-far, resulting in second generation optical PUFs becoming available.

Figure 4:
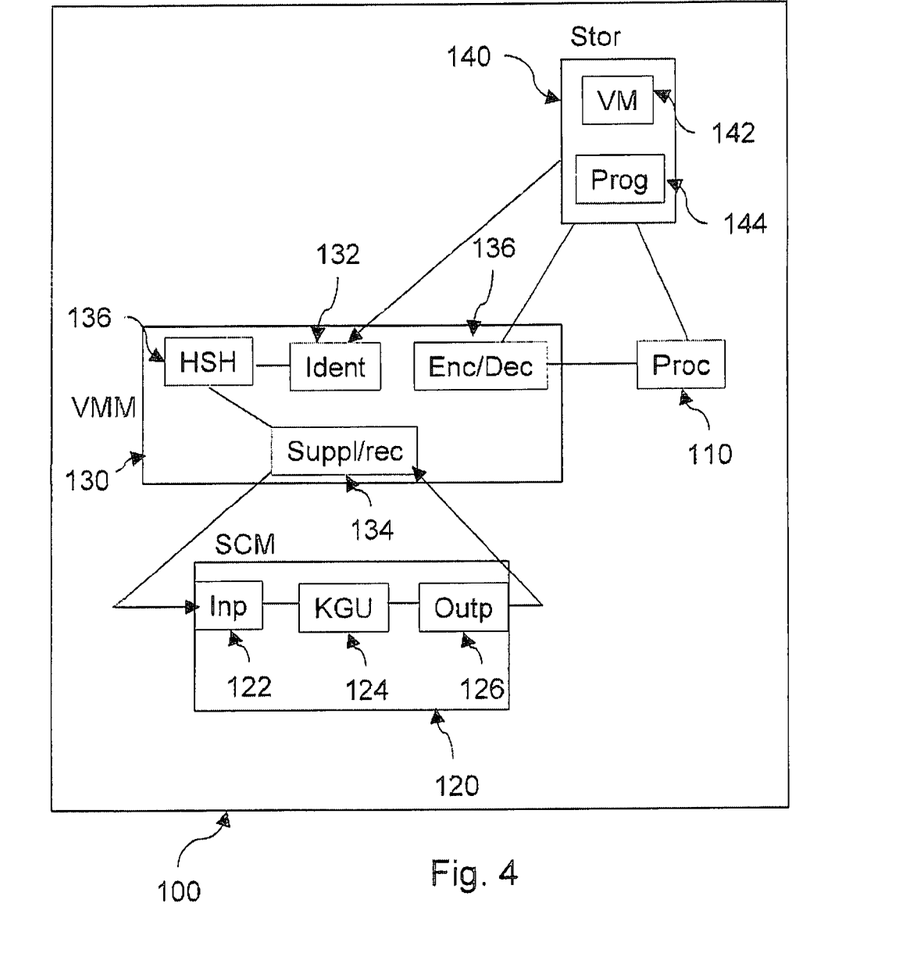
FIG. 4 illustrates an embodiment that uses a hash.

In a further embodiment, as shown in FIG. 4 the system includes means 136 for calculating a hash of the identifier associated with the data storage and using the hash as the representation supplied to the PUF. Advantageously, the hash is used to ensure that the identifier (and thus the security) depends on a large amount of digital data. For example, the hash may be calculated over the entire program 144 (or an important part of it), the virtual machine 142 (or an important part of it), and/or content processed by the program 144. The hash may be calculated using any mathematical hash, such as SHA-256 or SHA-512.

In an embodiment as shown in FIG. 5, the device 100 is arranged to cryptographically secure access by the processor to and from at least one of the following units external to the processor:

the storage 140,
an electronic main memory,
a program cache,
a data cache,
an I/O bus, shown as 510,
registers The program cache and/or data cache that is external to the package 510 of the processor 110 may be implemented in any suitable way. FIG. 5 shows that both the program cache and data cache are provided by the data storage 140 in the form of a cache (CCH) 146. FIG. 5 also illustrates the embodiment wherein the virtual machine manager 130 and the processor 110 are separate electronic circuits integrated in a single physical package 510. FIG. 5 (and the next FIG. 6) illustrates further the embodiment wherein the secure cryptographic module 120 is separate from the virtual machine manager 130 and from the processor 110. Registers are typically data stored in external hardware units (which of course may include a processor, such as a co-processor or graphics processor). Shown are units 520 (HW-1) and 530 (HW-2). Such units are usually accessible via the I/O bus 510 within device 100. If so desired also other busses or even direct connections may be used. The registers are not shown separately in the hardware units. The main memory may be of any suitable type, typically electronic memory. Depending on the device, the memory may be volatile (e.g. DRAM) or non-volatile (e.g. Flash). Any suitable I/O bus may be used. Current PCs are usually based around PCI Express. Clearly, smaller devices may have more restricted I/O busses.

FIG. 6 shows another embodiment, similar to the FIG. 5 embodiment. In the FIG. 6 embodiment, the virtual machine manager 130 is executed in software by the processor 110. The program for the virtual machine manager may be stored in the same storage 140 as other programs, such as the virtual machine 142, application programs 144 and, where applicable, the operating system (not shown). If so desired, the program for virtual machine manager may also be stored in a separate memory, e.g. a ROM. The program may also be physically integrated into the processor 110.

FIG. 7 shows another embodiment, wherein the secure cryptographic module 120 is physically integrated with the processor 110 into a single package 720. FIG. 7 is based on the FIG. 6 embodiment, but may equally well be combined with other embodiments, such as the FIG. 5 embodiments.

In an embodiment according to the invention, security is increased further by using different keys for each of the different uses. For example, a different key is used for memory access as for caches. This may be achieved by either taking a different post processing function or by binding the identifier also to the intended use.

It will be appreciated that the secure computing device according to the invention protects data that is input to and/or output from the processor. Typically the data protected is (part of the) data operated upon by a program loaded in the virtual machine. If so desired, also the program itself (or parts of it) may be protected or even parts of the virtual machine itself. In addition, other general encryption schemes may be used too. For example, the executable code could be encrypted in a regular way (e.g. using a key in polyfuses, or obfuscated in the image) while the communication between the application and the platform is encrypted in the way detailed in the invention. The program (executable code) may also be a media player, where the data is also protected using the DRM prescribed encryption.

It will be appreciated that the invention may be implemented in hardware component as well as in software, for example on a Digital Signal Processor (DSP) or optimised VLIW processors. For software implementation, the blocks described in the figures can be seen to represent functional software units. The invention thus also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A secure computing device comprising:
   a secure cryptographic module, including an input, a key generator configured and arranged to generate a cryptographic key in dependence on received input, and an output configured and arranged to produce the cryptographic key;
   a processor;
   a storage including a virtual machine that is executable on the processor, and at least one program that is executable on the virtual machine; and
   a virtual machine manager including:
      a first sub-component configured and arranged to determine a session identifier associated with the virtual machine that is unique in time;
      a second sub-component configured and arranged to supply a representation of the session identifier to the secure cryptographic module and retrieve the cryptographic key, which is specific to the virtual machine, from the secure cryptographic module; and
      a third sub-component configured and arranged to, under control of the cryptographic key, decrypt at least a part of data input to the processor and encrypting at least part of data output from the processor when the processor executes the virtual machine.

2. The device as claimed in claim 1, wherein the key generation unit generator includes a Physical Uncloneable Function (PUF).

3. The device as claimed in claim 1, wherein the session identifier is derived from at least one of the following: the virtual machine itself, and the program.

4. The device as claimed in claim 3, wherein the device includes a plurality of programs; each program executed on the virtual machine and operating on an associated digital content item stored in a data storage; and the virtual machine manager being arranged to derive the representation of the session identifier in dependence on the program and/or the digital content item associated with the program such that the representation of the session identifier is unique for the program.

5. The device as claimed in claim 1, wherein the secure computing device is operated under control of an operating system arranged to execute multiple processes associated with the virtual machine, the first sub-component is configured and arranged to determine the session identifier to determine the session identifier at a moment a process is activated, the session identifier is unique for the process or a program associated with the process, supply the session identifier as the identifier associated with the virtual machine, securely store in association with the process, as a session key, an output generated by the secure cryptographic module, and during a period in which a process is active, use the session key stored in association with the process as the cryptographic key for encrypting/decrypting at least part of the data operated upon by the process.

6. The device as claimed in claim 5, wherein the session identifier depends on at least one of a process identifier, a random number, and a timestamp.

7. The device as claimed in claim 1, wherein the device is arranged to cryptographically secure access by the processor to and from at least one of the following units external to the processor: the storage, an electronic main memory, a program cache, a data cache, an I/O bus, and a plurality of registers.

8. The device as claimed in claim 1, wherein the device includes a sub-component configured and arranged to calculate a hash of the session identifier associated with the virtual machine and the key generator is configured to generate the cryptographic key in dependence on the hash.

9. The device as claimed in claim 1, wherein the virtual machine manager and processor are implemented in a same tamper resistant unit.

10. The device as claimed in claim 1, wherein the virtual machine manager is implemented in software and arranged to be executed on the processor.

11. The device as claimed in claim 2, wherein the PUF is physically integrated with the virtual machine manager.

12. The device as claimed in claim 11, wherein the virtual machine manager is implemented on a semiconductor device and the PUF is integrated on the semiconductor device.

13. The device as claimed in claim 12, wherein the PUF is of one of an optical type and an electronic type.

14. The device as claimed in claim 1, wherein the virtual machine manager is implemented on a semiconductor device that is separate from the processor.

15. The device as claimed in claim 1, wherein the device is further configured to execute at least one additional virtual machine, included in the storage, on the processor.

16. The device as claimed in claim 1, wherein the device is further configured to execute a first portion of the program on the virtual machine, execute an additional virtual machine, included in the storage, on the processor, and execute a second portion of the program on the additional virtual machine.

17. The device as claimed in claim 1, wherein the device is further configured to execute a first operating system on the processor, the virtual machine being executed on the first operating system, and execute a second operating system on the virtual machine.

18. The device as claimed in claim 17, wherein the device is further configured to execute the program on the second operating system.

* * * * *